Jan. 5, 1965 J. T. KROENERT 3,164,800

UNDERWATER TELEPHONY

Filed April 18, 1958 5 Sheets-Sheet 1

INVENTOR
JOHN T. KROENERT
BY
ATTORNEYS

Jan. 5, 1965 J. T. KROENERT 3,164,800

UNDERWATER TELEPHONY

Filed April 18, 1958 5 Sheets-Sheet 2

INVENTOR
JOHN T. KROENERT
BY W. O. Quesenberry
Fred Hunteberger
ATTORNEYS

INVENTOR
JOHN T. KROENERT
BY
ATTORNEYS

POWER AMPLIFIER

BAND PASS FILTER

INVENTOR
JOHN T. KROENERT
BY [signature]
ATTORNEYS

BALANCED MODULATION

INVENTOR
JOHN T. KROENERT
BY W. O. Quesenberry
Fred. Hunterberger
ATTORNEYS

United States Patent Office 3,164,800
Patented Jan. 5, 1965

3,164,800

UNDERWATER TELEPHONY

John T. Kroenert, Utica, N.Y., assignor to the United States of America as represented by the Secretary of the Navy Filed Apr. 18, 1958, Ser. No. 729,482
20 Claims. (Cl. 340—5)
(Granted under Title 35, U.S. Code (1952), sec. 266)

The invention described herein may be manufactured and used by or for the Government of the United States of America for governmental purposes without the payment of any royalties thereon or therefor.

This invention relates to underwater telephony and particularly to apparatus that enables naval ships or stations to communicate with one another solely through water and without connecting wires. It is an improvement upon the subject matter of a copending application of Dr. Joseph W. Horton covering underwater telephone communication, Ser. No. 729,483, filed April 8, 1958, now abandoned.

An object of this invention is to provide an improved method and simple, portable, compact, and relatively inexpensive apparatus which enables ships or stations to have two way telephonic communication with one another, which will be successful in operation over relatively long distances, and with which the sounds transmitted will have maximum clarity and freedom from extraneous noises.

Other objects and advantages will be apparent from the following description of some embodiments of the invention, and the novel features will the particularly pointed out hereinafter in connection with the appended claims.

Figure 1:
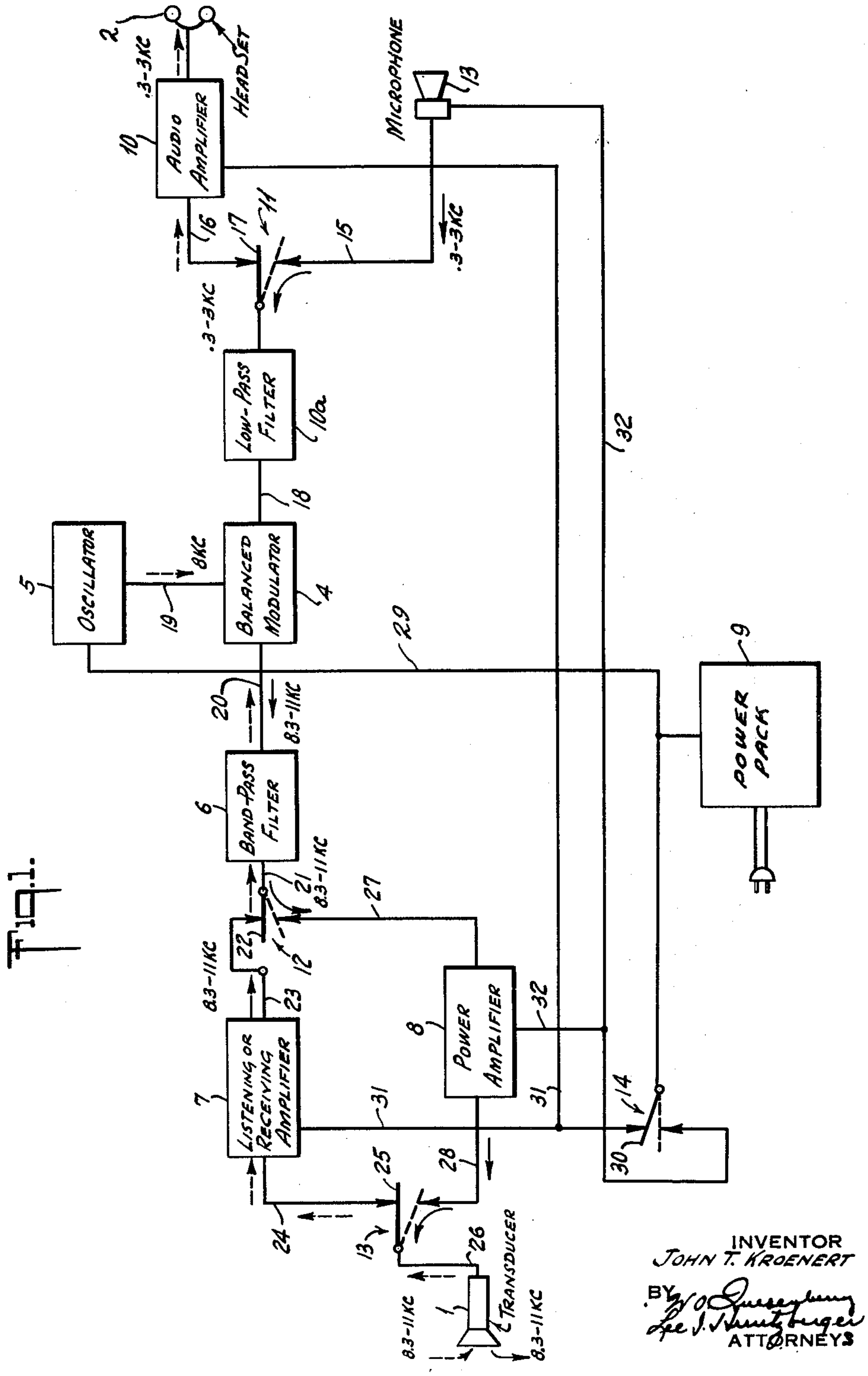
FIG. 1 is a schematic block diagram of combined sending and receiving apparatus embodying this invention.
Figure 2:
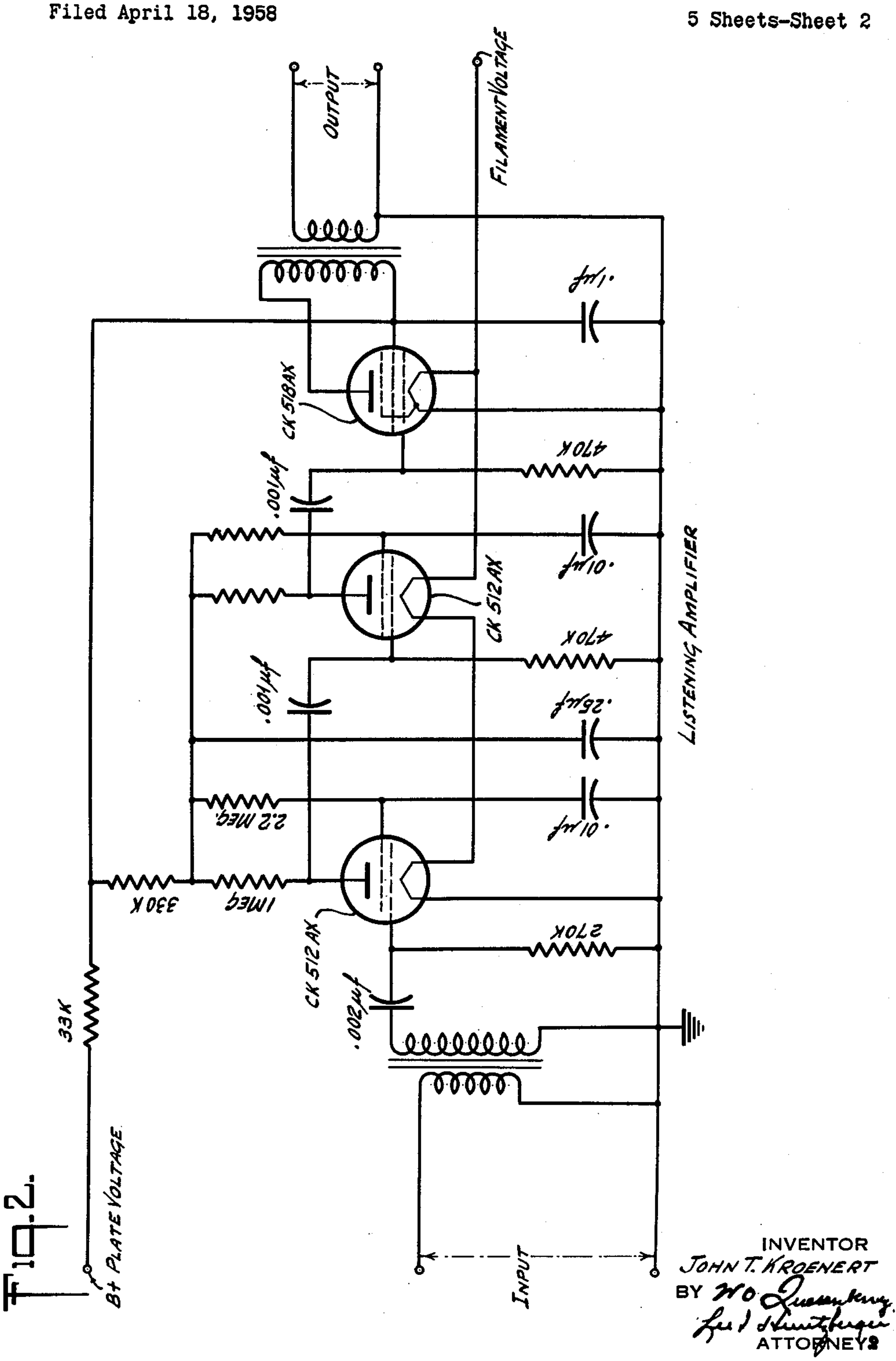
FIG. 2 is a circuit diagram of the listening amplifier part of the apparatus.
Figure 3:
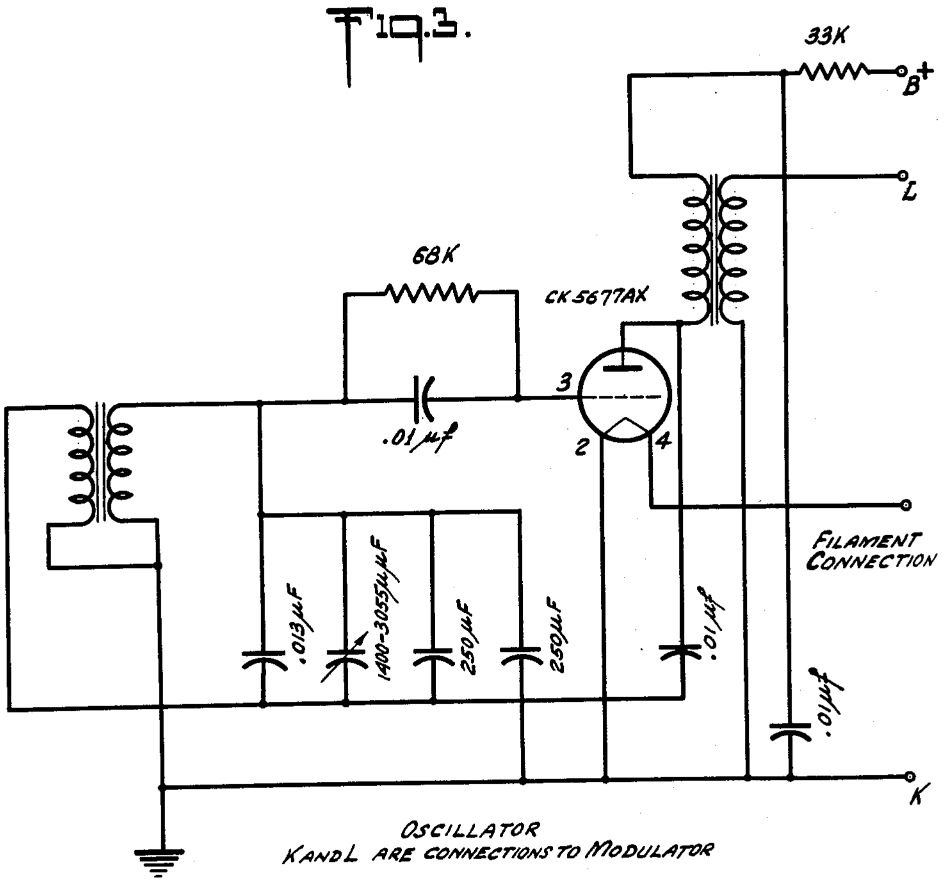
FIG. 3 is a circuit diagram of an oscillator used as a part of the apparatus.
Figure 4:
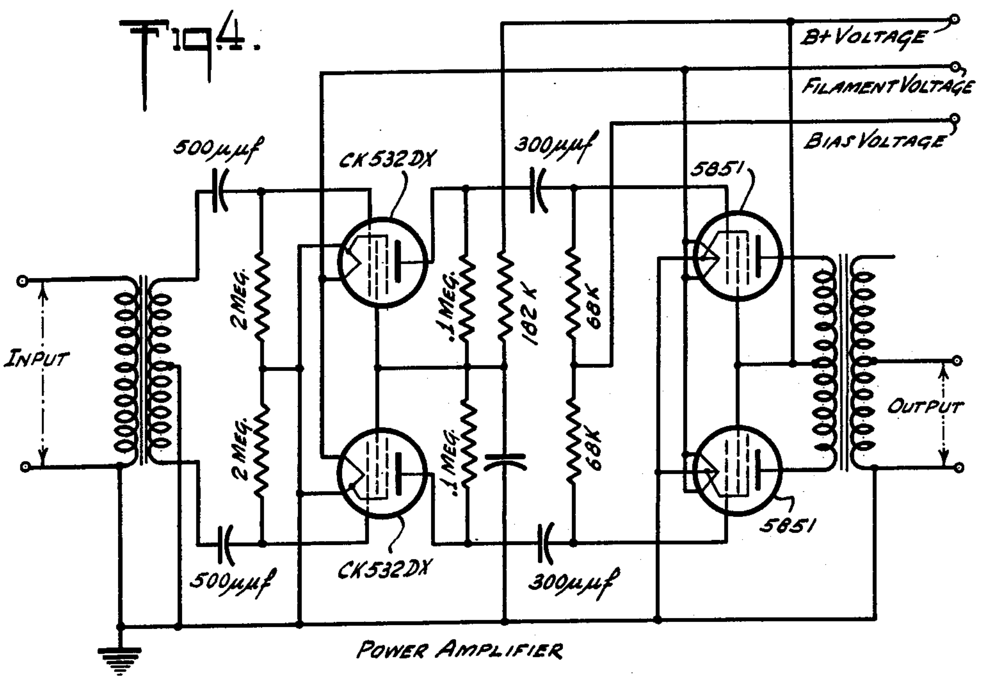
FIG. 4 is a circuit diagram of the power amplifier used as a part of the apparatus.
Figure 5:
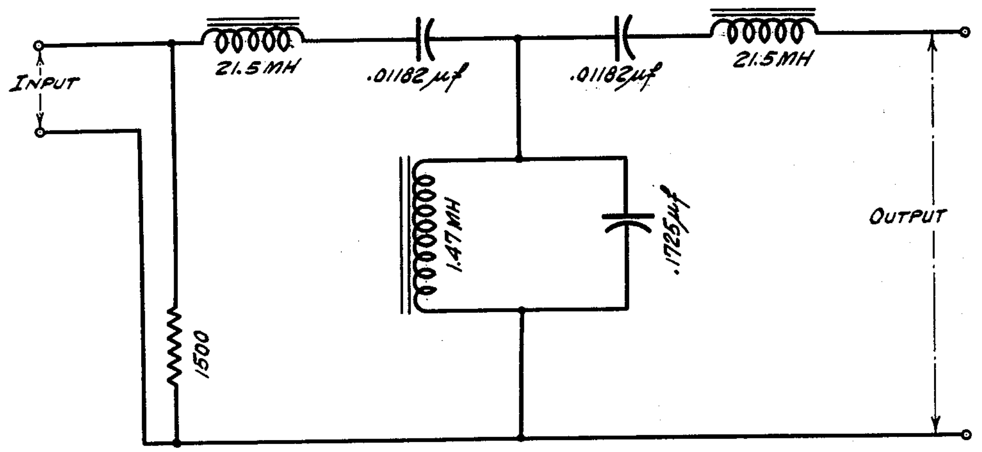
FIG. 5 is a circuit diagram of a band pass filter used as a part of the apparatus.
Figure 6:
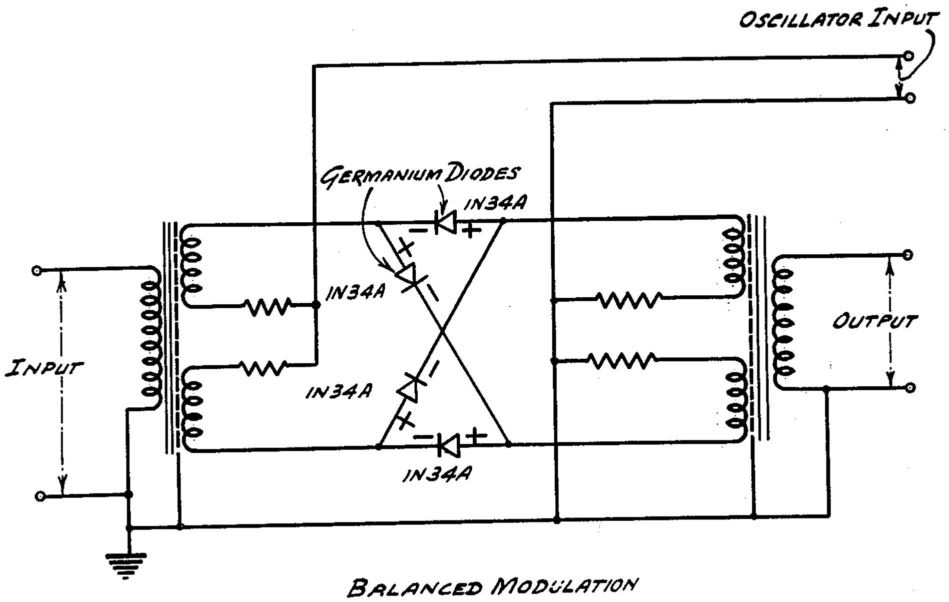
FIG. 6 is a circuit diagram of a balanced modulator used as a part of the apparatus.

Referring first to FIG. 1, the apparatus there illustrated employs a dual transducer 1, which, in use, is immersed in the body of water through which telephonic communication is to be had. It is called a dual transducer because it transforms or converts received electric signals into corresponding mechanical vibrations in the water for propagation as waterborne sounds through the water, and also receives from the water mechanical vibrations or waterborne sounds propagated in the water by another station, and converts or transforms them into corresponding electric signals. The illustrated apparatus also employs a telephone head set or speaker 2 which acts as a transducer and serves to convert electric signals into corresponding sound waves, a microphone or transducer 3 which converts or transforms sound waves into electric signals, a balanced modulator 4, an oscillator 5 which supplies a constant frequency, ultrasonic carrier signal to the modulator, a band-pass filter 6 which passes only signals within a selected bath width, a listening or receiver amplifier 7, a power amplifier 8, a power supply and rectifier 9, an audio amplifier 10, and two-way switches 11, 12, 13 and 14 which are mechanically coupled or ganged for operation together.

The microphone 3 is conductively connected by conductive means 15 to one contact of switch 11, the other contact of that switch being connected by conductive means 16 to the head set or speaker 2, with the audio amplifier 10 in series in said conductive means 16. The movable contact 17 of switch 11 is connected by conductive means 18 to the balanced modulator 4, and a low pass filter 10*a* is included in series in the conductive means 18. The oscillator 5 is connected by conductive means 19 to the modulator 4 for impressing on the latter the selected carrier frequency. The modulator 4 is connected by conductive means 20 to the band-pass filter 6, and the latter is connected by conductive means 21 to a fixed contact of the switch 12. The movable contact 22 of switch 12 is connected by conductive means 23 to the listening or receiver amplifier 7, and the latter is connected by conductive means 24 tc a fixed contact of switch 13. The movable contact 25 of switch 13 is connected by conductive means 26 to the dual transducer 1. The other fixed contact of switch 12 is connected by conductive means 27 to the power amplifier 8, and the latter is connected by conductive means 28 to the other fixed contact of switch 13.

The power supply 9 which supplies D.C. operating power to the above described apparatus is connected by conductive means 29, indicated by full lines in FIG. 1, to the oscillator 5 for continuously supplying operating power thereto, and also to the movable contact 30 of switch 14. One fixed contact of switch 14 is connected by conductive means 31, having two branches, to the amplifiers 7 and 10. The other fixed contact of switch 14 is connected by conductive means 32, having two branches, to the power amplifier 8 and microphone 3. The switches 11, 12, 13 and 14, which, as explained hereinbefore, are mechanically coupled together or ganged for concomitant operation, will all have their movable contacts 17, 22, 25 and 30 respectively, in the full line positions shown when the device is set for reception of signals that are transmitted through the water from another station, and all in the dotted line positions shown when the switches are all operated together to set the device for transmission of signals through the water to another station.

Assuming that the ganged or coupled switches have their movable contacts in their full line positions shown in FIG. 1, which represent the conditions for receiving signals, any waterborne sounds in the water from another station will be picked up by the dual transducer 1 and converted thereby into electric signals of corresponding frequency and transmitted in succession through the amplifier 7 where they are amplified, then through the band-pass filter 6 where only signals in a selected sideband are passed, then through the balanced modulator 4 where the carrier frequency from oscillator 5 is combined therewith. The modulated signals then pass through a low pass filter 10*a* where all signals except those in a selected band of audio frequency are suppressed and the signals in the passed band of audio frequency are amplified in amplifier 10 and transferred to the head set or speaker 2 where they are converted into airborne sound waves.

Assuming now that all of the switches 11, 12, 13 and 14 have their movable contacts moved into their dash line positions in FIG. 1, which sets the apparatus in condition to transmit signals, one speaks into the microphone 3 which converts the airborne sound waves of such speaking into electric signals, which signals are passed by the related conductive means through the low pass filter 10*a*, then through the modulator 4 where they modulate the amplitude of a constant frequency carrier signal from oscillator 5, and the modulated carrier signal then passes through the band-pass filter 6, which passes only one selected sideband of the modulated carrier signal, and suppresses the others. For example, only the upper sideband is passed. This passed sideband of the modulated carrier signal then is passed through the power amplifier 8 where it is amplified and passed on to the dual transducer 1 where the amplified signals of the passed sideband are converted into waterborne sound waves of corresponding frequency in the water in which transducer 1 is immersed. These waterborne sound waves are propagated through the water to another ship or a base station where they are received and converted into airborne sound waves in any suitable manner such as for example, by the receiving part of the apparatus shown in FIG. 1 and described hereinabove.

One satisfactory frequency range for both transmission and propagation of acoustic energy into water is approximately 8–11 kc. for a 3 kc. intelligence band. The apparatus shown in FIG. 1 and described hereinbefore, has excellent operating characteristics when utilized with a frequency range of transmission from the dual transducer 1 into the surrounding water medium of about 8.3 to 11.1 kc., where the microphone or other voice pickup device has a response in the range of about 250 cycles per second to about 3 kc. In such a case, the oscillator 5 has its frequency set at approximately 8.1 kc.

As one example of suitable operating conditions, that may be successfully used, the directions of movement of the signals in the different parts of the circuits are shown by full line arrows for sending, and by broken line arrows for receiving. Thus, in FIG. 1, in a transmitting operation, the signals from microphone 3 have a frequency in the range of about 0.3 kc. to 3 kc. and the frequency of the carrier signal is about 8.1 kc. The modulator will deliver an amplitude modulated carrier signal having two sideband frequencies of 8.3 to 11.1 kc. and 5 to 7.7 kc. When this amplitude modulated signal passes through the band-pass filter 6, only one sideband such as the upper sideband with a frequency of 8.3–11 kc. will be passed and this signal band, after amplification by amplifier 8 will be converted by dual transducer 1 into waterborne sound waves at corresponding frequencies.

In receiving operating conditions, the signal vibrations picked up and converted by dual transducer 1 will have a frequency in the range of about 8.3–11.1 kc. The signals in this frequency band will pass through the band-pass filter 6 where many noises, sounds, or signals outside of this frequency band of about 8.3 to 11.1 kc. that were picked up from the water by transducer 1, are suppressed and only signals in the frequency band of 8.3 to 11.1 kc. will be passed to the modulator 4. In the modulator 4 these passed signals will be combined with the carrier signal from oscillator 5 which will provide a modulated carrier signal having two sidebands of about 0.3 to 3 kc. and about 16.3 to 19.1 kc. This modulated carrier signal in passing through the low pass filter 10*a* will have its band of about 16.3 to 19.1 kc. suppressed, and the other sideband of about 0.3 to 3 kc. will be passed and amplified by amplifier 10, and then delivered to the speaker or head set 2 where the signals are converted into airborne sound waves and delivered at frequencies corresponding to the signals received by the speaker or head set 2.

The amplifiers 7 and 8, band-pass filter 6, oscillator 5, balanced modulator 4, low pass filter 10*a*, receiver amplifier 7, power amplifier 8, and audio amplifier 10 are of well-known constructions, but to provide a more complete and self-contained disclosure, typical circuits for the receiver amplifier, oscillator, power amplifier, band-pass filter, and modulator that may be successfully used are illustrated in FIGS. 2 to 6 respectively by way of example.

It will be observed that by using the same band-pass filter 6, the balanced modulator 4, and the oscillator 5, in both receiving and transmitting of signals, the equipment necessary is reduced to a minimum, which is a very important factor in keeping the equipment as compact and light in weight as possible.

It will be understood that various changes in the details and arrangements of parts, which have been herein described and illustrated in order to explain the nature of the invention, may be made by those skilled in the art within the principle and scope of the invention as expressed in the appended claims.

I claim:

1. An underwater telephone which comprises a microphone, a receiver unit for converting electrical signals into sound signals, a dual purpose transducer for converting electrical signals into mechanical vibratory signals and also for converting vibration signals into electrical signals, a balanced modulator, an oscillator operatively coupled to said modulator for combining the carrier signal of the oscillator with the signals passing through the modulator, a band pass filter means, a power amplifier, a receiver amplifier, sending circuit means including, the connection in series therein and in the sequence named, said microphone, said modulator, said filter means, said power amplifier, and said transducer, receiving circuit means including, in series therein and in the sequence named, said transducer, said receiver amplifier, said filter means, said modulator, and said receiver unit, and means including switches for selectively and alternately rendering said sending and receiving circuit means effective.

2. The telephone as set forth in claim 1, wherein said filter means passes only the upper sideband of the signal from said modulator.

3. The telephone as set forth in claim 1, wherein the signal leaving said modulator in the sending circuit has a frequency band of approximately 8 to 11.1 kc.

4. An underwater telephone which comprises means for converting intelligence signals into electric signals, means for creating a carrier wave, means for modulating the amplitude of said carrier wave by said signals, means operable for converting electric signals into corresponding waterborne signals for transmission through water and for converting waterborne signals into electric signals, means for conveying said amplitude modulated carrier wave to said second-mentioned converting means but having in series therein a band-pass filter which passes to the second converting means only one selected sideband of said modulated carrier wave, and receiving means including in series with one another in the sequence named, said second-mentioned converting means, an amplifier, said band-pass filter, said modulating means, another amplifier, and means for converting electric signals into intelligence signals.

5. An underwater telephone device for transmitting and receiving intelligence solely through water which comprises a transmitter having means for converting airborne sound waves into electric signals, means for supplying a constant frequency carrier signal, means for modulating the amplitude of said carrier signal by said electric signals, filter means connected to receive said amplitude modulated carrier signal, passing one sideband of that modulated signal, and suppressing all of the balance of that modulated signal, means for converting said passed sideband signals into waterborne sound waves of corresponding frequencies and propagating them in water as a transmitting medium to another station, and a receiver including therein said last-mentioned converting means for converting received waterborne sound waves into electric signals of corresponding frequencies, said filter means connected to receive said last-mentioned electric signals and passing solely those signal components of the received signals corresponding in frequency to said other passed sideband of frequencies, said means for supplying a constant frequency carrier signal, said modulating means in which said carrier signal is modulated by said signal components, means for receiving said last modulated carrier signal and passing and amplifying solely a sideband thereof which is of audio frequency, and means for converting said last-mentioned sideband of signals into airborne sound waves.

6. An underwater telephone device for transmitting and receiving intelligence solely through a body of water, which comprises one transducer for converting airborne sound wave signals into electric signals of corresponding frequencies, another transducer for converting electric signals into airborne sound waves of corresponding frequencies, a dual function transducer operable to convert electric signals into waterborne sound waves of corresponding frequencies and propagate them in said water and also convert received waterborne sound waves into electric signals of corresponding frequencies, a modulator, an oscillator continuously supplying to said modulator a constant frequency carrier signal, a band-pass filter, means for passing only signals of audio frequency, a transmitting circuit including in succession therein said one transducer, said signal passing means, said modulator, said band-pass filter, and said dual transducer, a receiving circuit including in succession therein said dual transducer, said band-pass filter, said modulator, said means for passing only signals of audio frequency, and said another transducer, and switch means for selectively and alternately completing said circuits, whereby said transmitting and receiving circuits use some parts in common, with resulting compactness in the device.

7. A system for underwater transmission and reception of voice intelligence; including a transmitter comprising a first transducer for converting voice intelligence into an electrical intelligence signal, an oscillator for generating a selected fixed frequency signal, a balanced modulator for mixing the oscillator output and said intelligence signal to produce an upper and lower sidebands suppressed-carrier amplitude modulated signal, a band pass filter for passing the upper sideband of the modulator output, and a second transducer for converting said upper sideband signal into corresponding acoustic energy and propagating the same into water; and including a receiver comprising a first transducer for receiving said propagated acoustic energy in water and converting it into a corresponding electric signal, a band pass filter for passing said signal, an oscillator for generating an electrical signal equal in frequency to that of the transmitter oscillator, a balanced modulator for mixing said filter passed signal and said oscillator output to produce an upper and lower sidebands suppressed-carrier amplitude modulated signal, means designed to reject the upper sideband frequencies and amplify the lower sideband frequencies of the modulator output, and a second transducer for converting the amplifier output to an audible intelligence; the output frequency of the two oscillators being chosen to provide for the second transducer output of the transmitter a frequency band of approximately 8–11 kc. when carrying intelligence having frequencies up to about 3 kc., thereby providing for optimum intelligibility of the transmitted intelligence.

8. A system for underwater transmission and reception of voice intelligence; including a transmitter comprising a first transducer for converting voice intelligence into an electrical intelligence signal, an oscillator for generating a selected fixed frequency signal, means for mixing the oscillator output and said intelligence signal to produce an upper and lower sidebands suppressed-carrier amplitude modulation of said oscillator signal, means for selectively passing the upper side-band signal, and a second transducer for converting said upper sideband signal into acoustic energy and propagating the same into water; and including a receiver comprising a first transducer for receiving said propagated acoustic energy in water and converting it into a corresponding electric signal, means for detecting the voice intelligence signal from the received signal, and means for transducing the detected signal to audible intelligence; the frequency of said oscillator being chosen to provide for the second transducer output of the transmitter a frequency band of approximately 8–11 kc. when carrying intelligence having frequencies up to about 3 kc., thereby providing optimum intelligibility of the transmitted intelligence.

9. A system for underwater transmission and reception of complex intelligence; including a transmitter comprising means for converting complex intelligence into a corresponding complex electrical intelligence signal, an oscillator for generating a selected fixed frequency signal, means for mixing the oscillator output and said intelligence signal to produce a single sideband suppressed-carrier amplitude modulation of said oscillator signal, and a transducer for converting said sideband signal into acoustic energy and propagating the same into water; and including a receiver comprising a transducer for receiving said propagated acoustic energy in water and converting it into a corresponding electric signal, means for detecting the original intelligence signal from the received signal, and means for converting the detected signal into a desired presentation form; the frequency of said oscillator being chosen to provide for the second transducer output of the transmitter a frequency band of approximately 8–11 kc. when carrying intelligence having frequencies up to about 3 kc., thereby providing for optimum intelligibility of the transmitted intelligence.

10. A system for underwater transmission and reception of complex intelligence; including a transmitter comprising means for converting complex intelligence into a corresponding complex electrical intelligence signal, modulator means for converting said intelligence signal into a single sideband amplitude modulation of a carrier signal, and a transducer for converting the sideband signal into acoustic energy and propagating the same into water; and including a receiver comprising a transducer for receiving said propagated acoustic energy in water and converting it into a corresponding electric signal, means for detecting the original intelligence signal from the received signal, and means for converting the detected signal into a desired presentation form; the modulator means being designed to provide a frequency band for said sideband signal of approximately 8–11 kc. when carrying intelligence having frequencies up to about 3 kc., thereby providing for optimum intelligibility of the transmitted intelligence.

11. An underwater transmitter for complex intelligence comprising means for converting complex intelligence into an electrical intelligence signal, an oscillator for generating a selected fixed frequency signal, a balanced modulator for mixing the oscillator output and said intelligence signal to produce an upper and lower sidebands suppressed-carrier amplitude modulated signal, a band pass filter for passing the upper sideband of the modulator output, and a transducer for converting said upper sideband signal into acoustic energy and propagating the same into water, the frequency of said oscillator being chosen to provide a frequency band for the second transducer output of aproximately 8–11 kc. when carrying intelligence having frequencies up to about 3 kc., thereby providing for optimum intelligibility of the transmitted intelligence when received and demodulated.

12. An underwater transmitter for complex intelligence comprising a first transducer for converting complex intelligence into an electrical intelligence signal, an oscillator for generating a selected fixed frequency signal, means for mixing the oscillator output and said intelligence signal to produce a single sideband suppressed-carrier amplitude modulation of said oscillator signal, and a second transducer for converting the sideband signal into acoustic energy and propagating the same into water, the frequency of said oscillator being chosen to provide a frequency band for the second transducer output of approximately 8–11 kc. when carrying intelligence having frequencies up to about 3 kc., thereby providing for optimum intelligibility of the transmitted intelligence when received and demodulated.

13. An underwater transmitter for complex intelligence comprising means for converting complex intelligence into a corresponding complex electrical intelligence signal, modulator means for converting said intelligence signal into a single sideband amplitude modulation of a carrier signal, and a transducer for converting the sideband signal into acoustic energy and propagating the same into water, the modulator means being designed to provide a frequency band for said sideband signal of approximately 8–11 kc. when carrying intelligence having frequencies up to about 3 kc., thereby providing for optimum intelligibility of the transmitted signal when received and demodulated.

14. A system for underwater transmission and reception of voice intelligence; including a transmitter comprising a first transducer for converting voice intelligence into an electrical intelligence signal, an oscillator for generating a selected fixed frequency signal, a balanced modulator for mixing the oscillator output and said intelligence signal to produce an upper and lower sidebands suppressed-carrier amplitude modulated signal, a band pass filter for passing the upper sideband of the modulator output, and a second transducer for converting said upper sideband signal into corresponding acoustic energy and propagating the same into water; and including a receiver comprising said second transducer for receiving said propagated acoustic energy in water and converting it into a corresponding electric signal, said band pass filter for passing said signal, said oscillator generating an electrical signal equal in frequency to that employed during transmission, said balanced modulator for mixing said filter passed signal and said oscillator output to produce an upper and lower sidebands suppressed-carrier amplitude modulated signal, means designed to reject the upper sideband frequencies and amplify the lower sideband frequencies of said modulator output, and a third transducer for converting the amplifier output to an audible intelligence, the output frequency of said oscillator being chosen to provide for said second transducer output during transmission a frequency band of approximately 8–11 kc. when carrying intelligence having frequencies up to about 3 kc. thereby providing for optimum intelligibility of the transmitted intelligence.

15. A system for underwater transmission and reception of voice intelligence; including a transmitter comprising a first transducer for converting voice intelligence into an electrical intelligence signal, an oscillator for generating a selected fixed frequency signal, means for mixing the oscillator output and said intelligence signal to produce an upper and lower sidebands suppressed-carrier amplitude modulation of said oscillator signal, means for selectively passing the upper sideband signal, and a second transducer for converting said upper sideband signal into acoustic energy and propagating the same into water; and including a receiver comprising said second transducer for receiving said propagated acoustic energy in water and converting it into a corresponding electrical signal, means including said mixing means for detecting the voice intelligence signal from the received signal, and means for transducing the detected signal to audible intelligence; the frequency of said oscillator being chosen to provide for said second transducer output of said transmitter a frequency band of approximately 8–11 kc. when carrying intelligence having frequencies up to about 3 kc. thereby providing optimum intelligibility of the transmitted intelligence.

16. A system for underwater transmission and reception of complex intelligence; including a transmitter comprising means for converting complex intelligence into a corresponding complex electrical intelligence signal, an oscillator for generating a selected fixed frequency signal, means for mixing the oscillator output and said intelligence signal to produce a single sideband suppressed-carrier amplitude modulaton of said oscillator signal, and a transducer for converting said sideband signal into acoustic energy and propagating the same into water; and including a receiver comprising said transducer for receiving said propagated acoustic energy in water and converting it into a corresponding electric signal, means including said mixing means for detecting the original intelligence signal from the received signal, and means for converting said detected signal into a desired presentation form; the frequency of said oscillator being chosen to provide for said transducer output during transmission a frequency band of approximately 8–11 kc. when carrying intelligence having frequencies up to about 3 kc., thereby providing for optimum intelligibility of the transmitted intelligence.

17. A system for underwater transmission and reception of complex intelligence; including a transmitter comprising means for converting complex intelligence into a corresponding complex electrical intelligence signal, modulator means for converting said intelligence signal into a single sideband amplitude modulation of a carrier signal, and a transducer for converting the sideband signal into acoustic energy and propagating the same into water; and including a receiver comprising said transducer for receiving said propagated acoustic energy in water and converting it into a corresponding electric signal, means including said modulator means for detecting the original intelligence signal from the received signal, and means for converting the detected signal into a desired presentation form; said modulator means being designed to provide a frequency band for said sideband signal of approximately 8–11 kc. when carrying intelligence up to about 3 kc. thereby providing for optimum intelligibility of the transmitted intelligence.

18. A transceiver for underwater transmission of voice intelligence comprising a first transducer for converting voice intelligence into electrical signals, an oscillator for generating a fixed frequency electrical output, a balanced modulator for mixing said oscillator output with a second electrical signal to produce an oscillator-frequency-suppressed amplitude modulated signal of upper and lower sidebands, a band pass filter means adapted to pass the upper side band frequencies connected to one side of said modulator, a second transducer connected to said band pass filter means for interconverting in water acoustic energy and electrical energy into their respective counterparts, means including amplifier means and low pass filter means adapted to pass frequencies below that of the oscillator output and reject frequencies above that of the oscillator output, means for converting the output of said low pass filter means to an audible signal, and means for selectively connecting the first transducer means and said amplifier means to the other side of said modulator for intelligence transmission and reception respectively, the frequency of the oscillator output being chosen to provide an upper sideband output of the modulator in the frequency range of approximately 8–11 kc. during transmission when carrying intelligence having frequencies up to about 3 kc., thereby providing for optimum intelligibility of the transmitted intelligence when received and demodulated.

19. A transceiver for underwater transmisison of complex intelligence comprising a means for converting complex intelligence into electrical intelligence signals, an oscillator for generating a fixed frequency electrical output, a balanced modulator for mixing said oscillator output with a second electrical signal to produce an oscillator-frequency-suppressed amplitude modulated signal of upper and lower sidebands, a band pass filter means adapted to pass the upper side band frequencies connected to one side of said modulator, a transducer connected to said band pass filter means for interconverting in water acoustic energy and electrical energy into their respective counterparts, means including amplifier means and low pass filter means adapted to pass frequencies below that of the oscillator output and reject frequencies above that of the oscillator output, means for converting the output of said low pass filter means to a desired presentation form, and means for selectively connecting the first mentioned means and said amplifier means to the other side of said modulator for intelligence transmission and reception respectively, the frequency of the oscillator output being chosen to provide for said upper side band during transmission a frequency band of approximately 8–11 kc. when carrying intelligence having frequencies up to about 3 kc. thereby providing for optimum intelligibility of the transmitted intelligence when received and demodulated.

20. A transceiver for underwater transmission of complex intelligence comprising a means for converting complex intelligence into electrical intelligence signals, an oscillator for generating a fixed frequency electrical output, a balanced modulator for mixing said oscillator output with a second electrical signal to produce an oscillator-frequency-suppressed amplitude modulated signal of upper and lower sidebands, a first filter means adapted to pass one sideband of frequencies connected to one side of said modulator means, a transducer connected to said first filter means for interconverting in water acoustic energy and electrical energy into their respective counterparts, means including amplifier means and a second filter means adapted to pass only frequencies below that of the oscillator output, means for converting the output of said second filter means to a desired presentation form and means for selectively connecting the first mentioned means and said amplifier means to the other side of said modulator for intelligence transmission and reception respectively, the frequency of the oscillator output being chosen to provide a frequency band for said sideband of frequencies passed by said first filter means during transmission of approximately 8–11 kc. when carrying intelligence having frequencies up to about 3 kc. thereby providing for optimum intelligibility of the transmitted signal when received and demodulated.

References Cited by the Examiner

UNITED STATES PATENTS

| | | | |
|---|---|---|---|
| 2,653,221 | 9/53 | Carnahan | 250–6.411 |
| 2,798,902 | 7/57 | Kursman et al. | 340—5 |
| 2,808,504 | 10/57 | Neumann et al. | 250—17.412 |

OTHER REFERENCES

MIL–C–17831A (Ships), Feb. 16, 1956.

Index of Specifications and Standards, Aug. 1, 1956 (used by Dept. of the Navy).

CHESTER L. JUSTUS, *Primary Examiner.*

FREDERICK M. STRADER, L. M. ANDRUS, ROBERT H. ROSE, *Examiners.*